(12) United States Patent
Onishi (10) Patent No.: US 11,267,461 B2
(45) Date of Patent: Mar. 8, 2022

(54) DRIVING ASSISTANCE APPARATUS AND DRIVING ASSISTANCE METHOD

(71) Applicant: Mitsubishi Electric Corporation, Tokyo (JP)

(72) Inventor: Kenta Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 159 days.

(21) Appl. No.: 16/338,603

(22) PCT Filed: Nov. 18, 2016

(86) PCT No.: PCT/JP2016/084255
§ 371 (c)(1),
(2) Date: Apr. 1, 2019

(87) PCT Pub. No.: WO2018/092265
PCT Pub. Date: May 24, 2018

(65) Prior Publication Data
US 2020/0039508 A1 Feb. 6, 2020

(51) Int. Cl.
*B60W 30/09* (2012.01)
*B60W 50/14* (2020.01)
(Continued)

(52) U.S. Cl.
CPC ............ *B60W 30/09* (2013.01); *B60W 50/14* (2013.01); *G05D 1/0088* (2013.01);
(Continued)

(58) Field of Classification Search
CPC ......... B60W 30/09; B60W 2554/4047; B60W 2554/4046; B60W 40/08; B60W 2040/0818; B60W 30/08; G08G 1/16
See application file for complete search history.

(56) References Cited

U.S. PATENT DOCUMENTS 8,676,487 B2 * 3/2014 Sakai .................... B60W 30/08
 701/301
9,007,198 B2 * 4/2015 Gunaratne ............. B60Q 9/008
 340/439

(Continued)

FOREIGN PATENT DOCUMENTS

JP 04-071000 A 3/1992
JP 2003-146117 A 5/2003
(Continued)

OTHER PUBLICATIONS

Notice of Reasons for Refusal dated Jun. 11, 2019 issued by the Japanese Patent Office in counterpart Application No. 2018-550961.
(Continued)

*Primary Examiner* — Peter D Nolan
*Assistant Examiner* — Kenneth M Dunne
(74) *Attorney, Agent, or Firm* — Sughrue Mion, PLLC; Richard C. Turner (57) ABSTRACT

A driving assistance apparatus includes processing circuit, and a communicator that communicates with the outside. The processing circuitry executes the following processes: identifying a driving state of a driver in a following vehicle behind a subject vehicle on the basis of a rear image containing the back of the subject vehicle; determining circumstances around the subject vehicle on the basis of images around the subject vehicle including the rear image; and controlling the autonomous driving of the subject vehicle on the basis of the driving state of the driver in the following vehicle, identified in the identifying process, and the circumstances, determined in the determining process.

14 Claims, 10 Drawing Sheets

(51) Int. Cl.
  *G05D 1/00*   (2006.01)
  *G05D 1/02*   (2020.01)
  *G08G 1/16*   (2006.01)

(52) U.S. Cl.
  CPC ........... *G05D 1/0246* (2013.01); *G08G 1/161* (2013.01); *B60W 2050/146* (2013.01); *B60W 2420/42* (2013.01); *B60W 2540/30* (2013.01); *B60W 2554/801* (2020.02); *B60W 2554/804* (2020.02); *G05D 1/0276* (2013.01); *G05D 2201/0213* (2013.01)

(56) References Cited

U.S. PATENT DOCUMENTS

| | | | | |
|---|---|---|---|---|
| 10,810,966 | B1* | 10/2020 | Landgraf | G06K 9/00597 |
| 2004/0193347 | A1* | 9/2004 | Harumoto | G08G 1/167 |
| | | | | 701/45 |
| 2012/0083960 | A1* | 4/2012 | Zhu | G06K 9/00805 |
| | | | | 701/23 |
| 2015/0091740 | A1* | 4/2015 | Bai | B60Q 9/008 |
| | | | | 340/901 |
| 2015/0161894 | A1* | 6/2015 | Duncan | G06K 9/00845 |
| | | | | 701/1 |
| 2017/0259816 | A1* | 9/2017 | Takeda | B60W 30/0953 |
| 2019/0196486 | A1* | 6/2019 | Ishikawa | B60W 30/143 |

FOREIGN PATENT DOCUMENTS

| | | | | |
|---|---|---|---|---|
| JP | 2005-062912 | A | 3/2005 | |
| JP | 2006-293531 | A | 10/2006 | |
| JP | 2008-077309 | A | 4/2008 | |
| JP | 2008077309 | * | 4/2008 | ............... G08G 1/16 |
| JP | 2012-079125 | A | 4/2012 | |
| JP | 2015-103003 | A | 6/2015 | |

OTHER PUBLICATIONS

International Search Report for PCT/JP2016/084255 dated Feb. 14, 2017 [PCT/ISA/210].

Communication dated Jan. 6, 2021, from the China National Intellectual Property Administration in application No. 201680090663.4.

Communication dated Jul. 9, 2021, from the China National Intellectual Property Administration in application No. 201680090663.4.

Communication dated Oct. 29, 2021 from the China National Intellectual Property Administration in Chinese Application No. 201680090663.4.

* cited by examiner

DRIVING ASSISTANCE APPARATUS AND DRIVING ASSISTANCE METHOD

CROSS REFERENCE TO RELATED APPLICATIONS

This application is a National Stage of International Application No. PCT/JP2016/084255 filed Nov. 18, 2016.

TECHNICAL FIELD

The present invention relates to driving assistance apparatuses. In particular, the present invention relates to a driving assistance apparatus securing the safety of a subject vehicle on the basis of information about a non-subject vehicle around the subject vehicle.

BACKGROUND ART

Patent Document 1 discloses a driving assistance apparatus that assists driving based on monitoring information about the behavior of a following vehicle, so that a driver can avoid dangers while travelling his/her vehicle.

That is, Patent Document 1 discloses that a rear vehicle-distance sensor monitors a following vehicle traveling behind a subject vehicle. In addition, a performance-determination electronic control unit (ECU) estimates the driving aspect of the following vehicle in accordance with the monitoring information obtained from the rear vehicle-distance sensor, and evaluates the estimated driving aspect on the basis of a predetermined driving evaluation standard. Furthermore, Patent Document 1 discloses a technique in which a display speaker makes a notification in conformance with the evaluation result obtained from the performance determination ECU, to the driver of the subject vehicle.

PRIOR ART DOCUMENT

Patent Document

Patent Document 1: Japanese Patent Application Laid-Open No. 2006-293531

SUMMARY

Problem to be Solved by the Invention

The driving assistance apparatus in Patent Document 1 can help the driver of the subject vehicle avoid dangers during driving, by monitoring the following vehicle, and notifying the driving performance of the following vehicle to the driver of the subject vehicle on the basis of the estimated driving aspect. Unfortunately, when a dangerously running vehicle (e.g., a vehicle whose driver is drowsy) is approaching the subject vehicle, the driver cannot necessarily handle this situation calmly. The driving assistance apparatus cannot secure the safety of the subject vehicle with certainty in this situation.

To solve this problem, it is an object of the present invention to provide a driving assistance apparatus that secures the safety of a subject vehicle with certainty if a dangerously running vehicle is approaching the subject vehicle.

Means to Solve the Problem

A driving assistance apparatus according to the present invention includes processing circuitry, and a communicator that communicates with the outside. The processing circuitry executes the following processes: identifying the driving state of a driver of a following vehicle on the basis of a rear image captured by a rear camera that captures the back of a subject vehicle; determining circumstances around the subject vehicle on the basis of images around the subject vehicle including the rear image; and controlling the autonomous driving of the subject vehicle on the basis of the driving state, which is identified in the identifying process, and the circumstances, which are determined in the determining process. The identifying process includes recognizing the driving state by determining, through pattern matching, the face orientation of the driver of the following vehicle and whether the eyes of the driver of the following vehicle are open or closed. The identifying process includes upon determining that the following vehicle is in dangerous driving state, notifying the following vehicle of the dangerous driving state via the communicator. The controlling process includes upon determination, in the identifying process, that the following vehicle is in the dangerous driving state, controlling the autonomous driving on the basis of the circumstances, which are determined in the determining process, so that a collision against the following vehicle is avoided.

Effects of the Invention

The driving assistance apparatus according to the present invention enables assistance of driving so that the safety of the subject vehicle can be secured with certainty if a dangerously running vehicle is approaching the subject vehicle.

DESCRIPTION OF EMBODIMENT(S)

First Embodiment

Configuration of Apparatus

Figure 1:
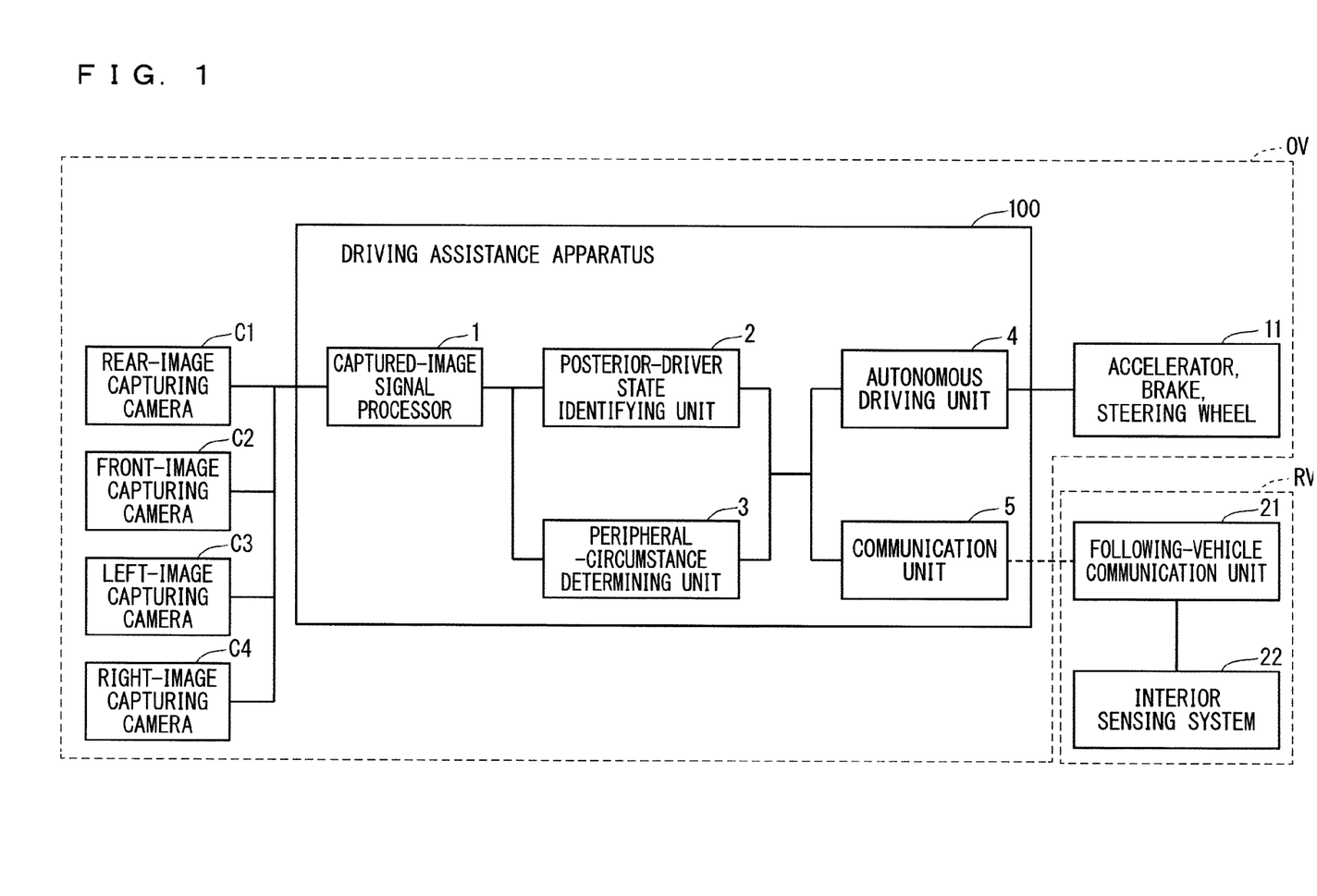
FIG. 1 is a block diagram illustrating the configuration of a driving assistance apparatus according to an embodiment of the present invention.

FIG. 1 is a block diagram illustrating the configuration of a driving assistance apparatus 100 according to an embodiment of the present invention. The driving assistance apparatus 100 is on board a vehicle OV. As illustrated in FIG. 1, the driving assistance apparatus 100 includes a captured-image signal processor 1, a posterior-driver state identifying unit 2, a peripheral-circumstance determining unit 3, an autonomous driving unit 4, and a communication unit 5.

The captured-image signal processor 1 receives the signals of images captured by a rear-image capturing camera C1 (i.e., rear camera), a front-image capturing camera C2 (i.e., front camera), a left-image capturing camera C3 (i.e., left camera), and a right-image capturing camera C4 (i.e., right camera). The captured-image signal processor 1 processes these captured-image signals in a predetermined manner, thus outputting processed image data pieces. Hereinafter, the vehicle OV is also referred to as a subject vehicle OV in some cases.

The posterior-driver state identifying unit 2 receives a rear-image data piece, which is processed from a rear image captured by the rear-image capturing camera C1, among the processed image data pieces from the captured-image signal processor 1. Based on this rear-image data piece, the posterior-driver state identifying unit 2 identifies the presence or absence of a following vehicle and the driving state (e.g., the presence or absence of dangerous driving) of the driver of the following vehicle, and then outputs the identification result.

The peripheral-circumstance determining unit 3 receives, among the processed image data pieces from the captured-image signal processor 1, a front-image data piece, which is processed from a front image captured by the front-image capturing camera C2, a left-image data piece, which is processed from a left image captured by the left-image capturing camera C3, a right-image data piece, which is processed from a right image captured by the right-image capturing camera C4, and the rear-image data piece. Based on these image data pieces, the peripheral-circumstance determining unit 3 determines the presence or absence of a vehicle around the subject vehicle, and other things, and then outputs the determination result. The front image, the rear image, the left image, and the right image are referred to as peripheral images.

The autonomous driving unit 4 controls vehicle devices 11, such as the accelerator, the brake, and the steering wheel, on the basis of the identification result from the posterior-driver state identifying unit 2 and the determination result from the peripheral-circumstance determining unit 3. The autonomous driving unit 4 is so-called an advanced driving assistant system (ADAS)-ECU.

The communication unit 5 communicates with infrastructure devices outside the subject vehicle (e.g., a communication base station) and devices outside the subject vehicle (e.g., devices of non-subject vehicles). FIG. 1 illustrates an example where the communication unit 5 communicates with a communication unit 21 of a following vehicle RV. In FIG. 1, the following vehicle RV includes an interior sensing system 22, such as an interior camera. The interior sensing system 22 can determine the driving state of the driver of the following vehicle RV. Further, the interior sensing system 22 receives and transmits data to and from the communication unit 21.

The main components of the driving assistance apparatus 100 except the communication unit 5 can be configured using a computer, and each can be implemented by the computer executing a program. That is, the captured-image signal processor 1, the posterior-driver state identifying unit 2, the peripheral-circumstance determining unit 3, and the autonomous driving unit 4 of the driving assistance apparatus 100 in FIG. 1 are implanted by, for instance, a processing circuit 10 illustrated in FIG. 2. A processor (e.g., a central processing unit or CPU for short, or a digital signal processor or DSP for short) is used as the processing circuit 10. The functions of the individual components are implemented by executing a program stored in a storage.

Figure 2:
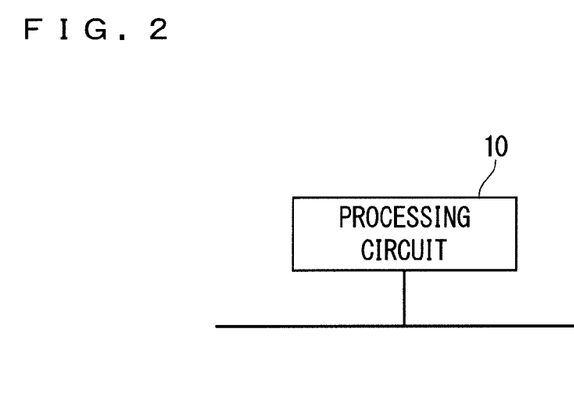
FIG. 2 is a block diagram illustrating the hardware configuration of the driving assistance apparatus according to the embodiment of the present invention.

It is noted that dedicated hardware may be used as the processing circuit 10. For dedicated hardware being the processing circuit 10, examples of the processing circuit 10 include a single circuit, a complex circuit, a programmed processor, a parallel-programmed processor, an ASIC, an FPGA and a combination thereof.

Figure 3:
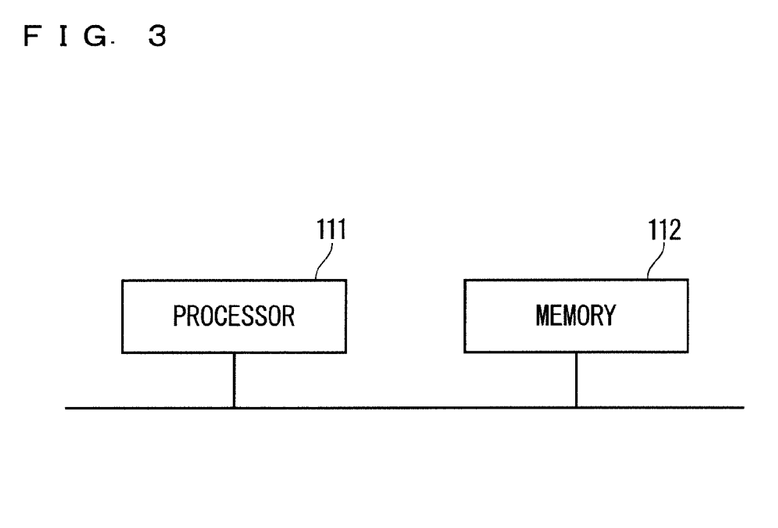
FIG. 3 is a block diagram illustrating the hardware configuration of the driving assistance apparatus according to the embodiment of the present invention.

FIG. 3 illustrates a hardware configuration in which the individual components of the driving assistance apparatus 100 illustrated in FIG. 1 (i.e., the captured-image signal processor 1, the posterior-driver state identifying unit 2, the peripheral-circumstance determining unit 3, and the autonomous driving unit 4) are configured using a processor. In this case, the function of each component of the driving assistance apparatus 100 is implemented in combination with software and other things (e.g., software, firmware, or software and firmware). The software and other things are written as a program and stored in a memory 112 (storage). A processor 111, which serves as the processing circuit 10, implements the functions of the individual components by reading and executing the program stored in the memory 112.

Figure 4:
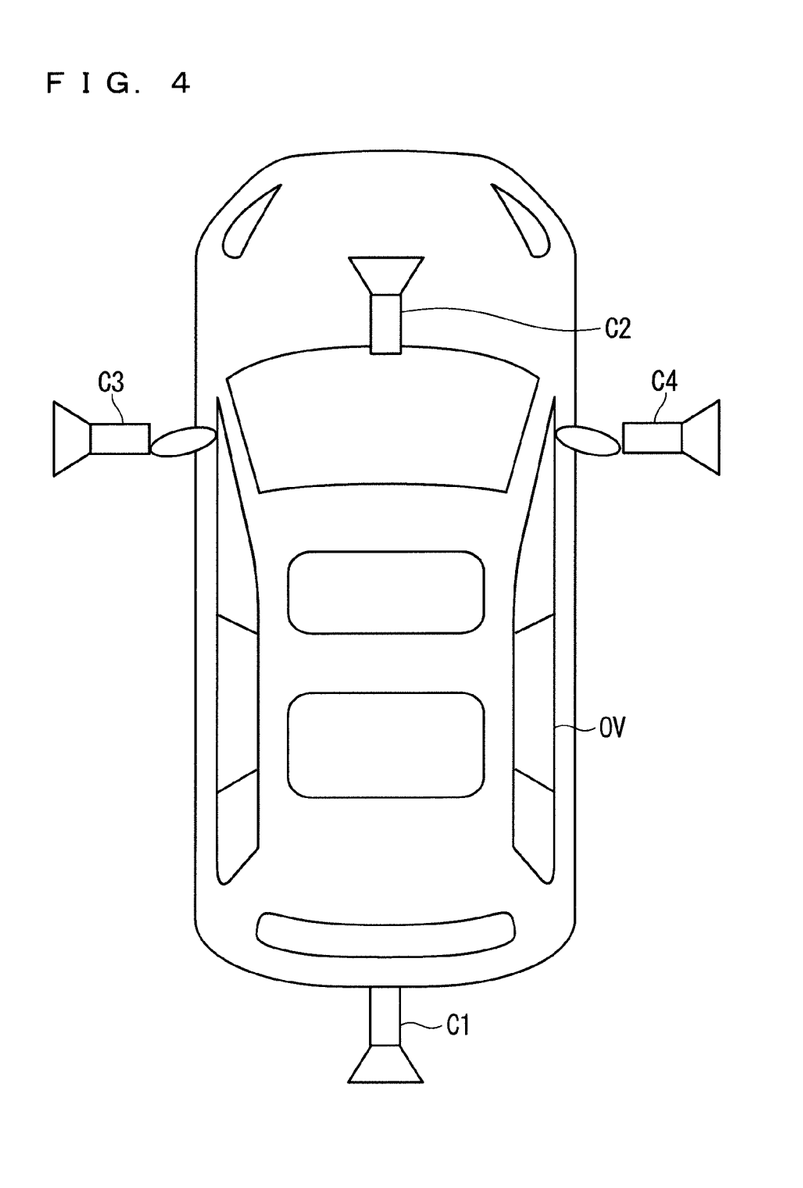
FIG. 4 is a schematic diagram illustrating an example of where individual cameras are placed.

FIG. 4 is a schematic diagram illustrating an example of the placement of the rear-image capturing camera C1, the front-image capturing camera C2, the left-image capturing camera C3, and the right-image capturing camera C4, which are disposed in the subject vehicle OV. As illustrated in FIG. 4, the rear-image capturing camera C1, the front-image capturing camera C2, the left-image capturing camera C3, and the right-image capturing camera C4 are placed so as to respectively capture an image at the back of the subject vehicle OV, an image in front of the subject vehicle OV, an image on the left of the subject vehicle OV, and an image on the right of the subject vehicle OV. The rear-image capturing camera C1 is placed in a position where the driver of a following vehicle can be captured. The front-image capturing camera C2 is placed in a position where a certain angle range in front of the subject vehicle OV can be captured. The left-image capturing camera C3 is placed in a position where the left lane can be captured. The right-image capturing camera C4 is placed in a position where the right lane can be captured. It is noted that these cameras, although placed outside the vehicle in FIG. 4 for convenience, may be placed inside the vehicle or on the sidewalls of the vehicle body. These cameras may be placed anywhere that satisfy the aforementioned image-capturing ranges.

Operation

Using the flowchart in FIG. 5, a process in the driving assistance apparatus 100 will be described with reference to FIG. 1.

Upon actuation of the driving assistance apparatus 100, the driving assistance apparatus 100 starts operating, and acquires an image at the back of the subject vehicle OV with the rear-image capturing camera C1 (step S1).

The signal of the acquired image is input to the captured-image signal processor 1, undergoes predetermined image processing in the captured-image signal processor 1, and is then output to the posterior-driver state identifying unit 2 as a processed image data piece. The posterior-driver state identifying unit 2 identifies the presence or absence of a following vehicle RV and the driving state of the driver of the following vehicle RV through pattern matching using the processed image data piece (step S2).

Upon identification that the driver of the following vehicle RV is in dangerous driving state (e.g., the driver is drowsy while driving), the communication unit 5 notifies that the following vehicle is in the dangerous driving state to the following vehicle (step S3). At this stage, the communication unit 5 may notify the identification result through direct communication with the communication unit 21 of the following vehicle, i.e., through vehicle-to-vehicle communication. Alternatively, the communication unit 5 may notify the identification result using an external infrastructure device (e.g., a communication base station) via a communication network device, i.e., through vehicle-to-roadside-infrastructure communication.

The posterior-driver state identifying unit 2 then determines whether the following vehicle RV has the function of interior sensing (step S4). In the function of interior sensing, the face and other parts of the driver are captured using an interior camera to detect, for instance, whether the eyes are open or closed, a pupillary motion, and how the eye point is moving, thus detecting the driving state of the driver. Upon determination of drowsy driving for instance, the function of interior sensing alerts the driver using a sound, vibrations, and other means. If the following vehicle RV is determined to have such an interior sensing system as an interior system, the identification result of the driver's state identified by the subject vehicle OV is integrated with the determination result in the interior sensing system obtained from the following vehicle RV via the communication unit 5 (step S5).

Here, the integration is checking the driver's state identified in the subject vehicle OV against the driver's state included in the determination result in the interior sensing system, thus determining which of them is to be employed. In some cases, the interior sensing system provides a determination result indicating that the driver is not drowsy, whereas the driver's state identified in the subject vehicle OV is drowsy driving. In these cases, the driver is determined to be not drowsy. In other cases, the driver's state identified in the subject vehicle OV is drowsy driving, and the interior sensing system provides a determination result indicating distracted driving. In these cases, the driver is determined to be distracted. As such, the determination result in the interior sensing system, which is more accurate, is employed.

If the following vehicle RV is determined to not have the function of interior sensing in step S4, the process proceeds to step S6.

Whether the following vehicle RV has the function of interior sensing is determined through notification of a dangerous driving state; the following vehicle RV can be determined to not have the function of interior sensing when the following vehicle RV transmits neither a signal of receipt in response to this notification nor a determination result of interior sensing.

Meanwhile, the following vehicle RV, when having the function of interior sensing, transmits the determination result of interior sensing. With this determination result, the following vehicle RV can be determined to have the function of interior sensing.

It is noted that whether the following vehicle RV has the function of interior sensing in step S4 may be determined without the notification in step S3. In this case, whether the following vehicle RV has the function of interior sensing is determined by transmitting a signal requesting the result of interior sensing to the following vehicle RV via the communication unit 5; the following vehicle RV can be determined to not have the function of interior sensing when the following vehicle RV transmits neither a signal of receipt in response to the request signal nor the determination result of interior sensing.

The posterior-driver state identifying unit 2 makes the final determination on whether the driving state of the driver is a dangerous driving state, such as drowsy driving or distracted driving, on the basis of the result of the integration (step S6).

The driving state of the driver of the following vehicle RV is determined based on the result of the integration of the driver's state identified in the subject vehicle OV and the driver's state included in the determination result in the interior sensing system. Such determination enables higher accurate determination.

If the driver of the following vehicle RV is determined to be in the dangerous driving state in step S6, the posterior-driver state identifying unit 2 alerts the following vehicle RV via the communication unit 5 and also alerts the driver of the subject vehicle (step S7). If the driver of the following vehicle RV is determined to be not in the dangerous driving state in step S6, the procedures after step S1 are repeated.

Furthermore, when the following vehicle RV does not have the function of interior sensing, the posterior-driver state identifying unit 2 makes the final determination on whether the driver is in the dangerous driving state, such as drowsy driving or distracted driving, on the basis of the driving state of the driver of the following vehicle RV identified by the posterior-driver state identifying unit 2. If the driver is determined to be in the dangerous driving state, the posterior-driver state identifying unit 2 alerts the driver of the subject vehicle (step S7). In some cases, the following vehicle RV, although not having the function of interior sensing, has an autonomous driving apparatus. In these cases, the following vehicle RV is notified of an alert; then, the autonomous driving apparatus can execute autonomous driving in response to the alert.

Figure 6:
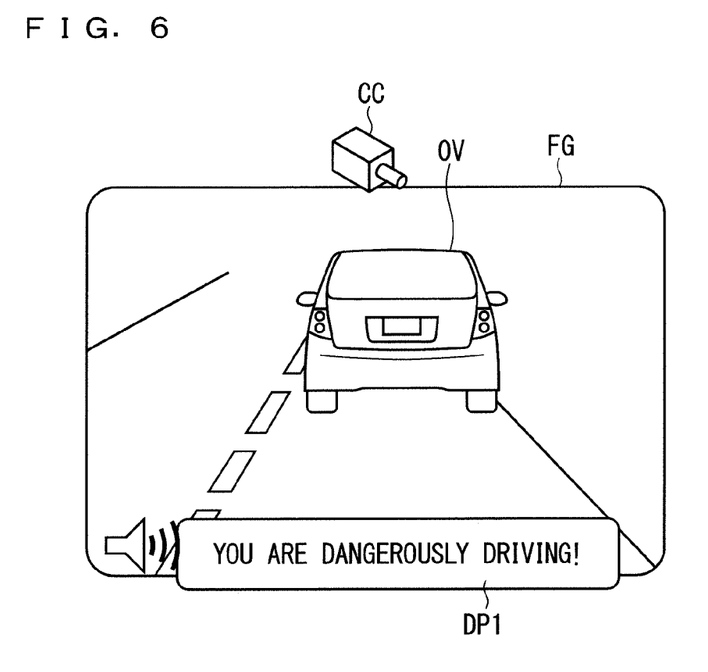
FIG. 6 is a schematic diagram illustrating an example of how to alert a following vehicle.
Figure 7:
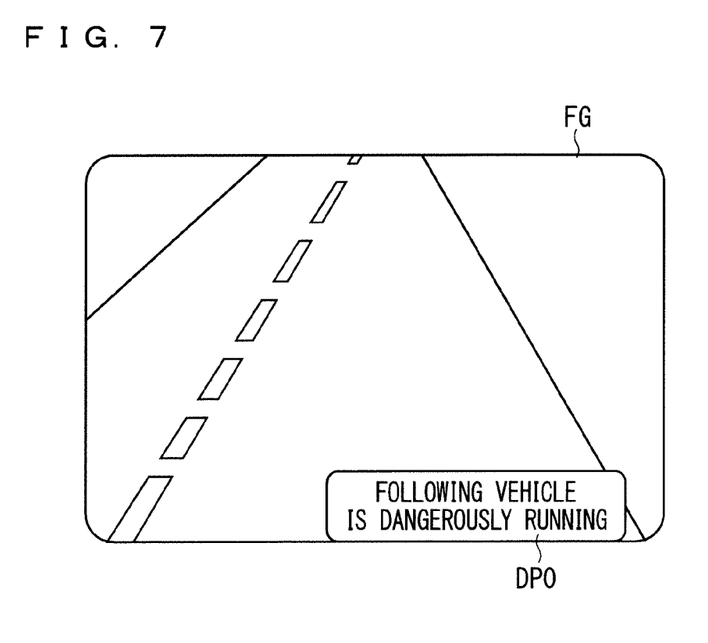
FIG. 7 is a schematic diagram illustrating an example of how to alert a subject vehicle.

The following describes one aspect of alerting with reference to FIGS. 6 and 7. FIG. 6 is a schematic diagram illustrating how the following vehicle RV is notified of an alert. FIG. 6 shows a superimposition display DP1 disposed in part of the windshield FG of the following vehicle RV. An alert indicating that the following vehicle RV is in dangerous driving state pops up on the superimposition display DP1 along with an audible alert and a warning. Another potential aspect of alerting is an alert through vibration of the driver's seat or steering wheel. Referring to the following vehicle RV having the function of interior sensing, an interior camera CC in the following vehicle RV captures the face and other parts of the driver, and the interior sensing system then gives an alert in the aforementioned manner. Cooperation with the interior sensing system enables notification of the determination result in step S6 to the following vehicle RV.

FIG. 7 is a schematic diagram illustrating how the subject vehicle OV is notified of an alert. FIG. 7 shows a superimposition display DP0 disposed in part of the windshield FG of the subject vehicle OV. An alert indicating that the following vehicle is in dangerous driving state pops up on the superimposition display DP0. Notifying the subject vehicle OV of the following vehicle being in dangerous driving state enables the driver of the subject vehicle OV to be aware of a danger, and gives some time to prepare for the danger.

It is noted that image superposition display on a windshield is a publicly known technique. It is also noted that projected-image superposition display using a projector is a widely known technique.

Executing the procedure in step S5 requires a system to be established that is capable of transmitting and receiving data between the interior sensing system of the following vehicle RV and the driving assistance apparatus 100 of the subject vehicle OV. Such a system can be established between vehicles made by the same automobile manufacturer, or between vehicles having autonomous driving apparatuses that conform to a unified standard.

After step S7, in which the drivers of the following vehicle RV and the subject vehicle OV are alerted, the posterior-driver state identifying unit 2 determines the vehicle distance between the following vehicle RV and the subject vehicle OV (step S8). The vehicle distance is determined by calculating a distance relative to the following vehicle RV using the position of the following vehicle RV in a coordinate system on the image, a table showing the relationship between a previously prepared position in the coordinate system and a relative distance, and other things, on the basis of processed image data pieces about the following vehicle RV. Once the relative distance is determined, a speed relative to the following vehicle RV is also calculated from time changes in the relative distance. It is noted that calculating a relative distance using image data is a well-known technique.

Also in step S8, the peripheral-circumstance determining unit 3 checks for an empty space around the subject vehicle. This checking is performed by determining, for instance, the presence or absence of a vehicle around the subject vehicle on the basis of a front-image data piece, which is processed from a front image captured by the front-image capturing camera C2, a left-image data piece, which is processed from a left image captured by the left-image capturing camera C3, a right-image data piece, which is processed from a right image captured by the right-image capturing camera C4, and a rear-image data piece.

That is, the peripheral-circumstance determining unit 3 checks for vehicles in front, on the left, on the right, and at the back of the subject vehicle OV through pattern matching on the basis of the front-image data piece, the left-image data piece, the right-image data piece, and the rear-image data piece. If a vehicle is not in one of the directions: the front, left, and right of the subject vehicle OV, the peripheral-circumstance determining unit 3 determines that there is an empty space in this direction. If vehicles are in all the directions, the peripheral-circumstance determining unit 3 determines that no empty space is around the subject vehicle OV. The result of the determination is transmitted to the autonomous driving unit 4.

Figure 8:
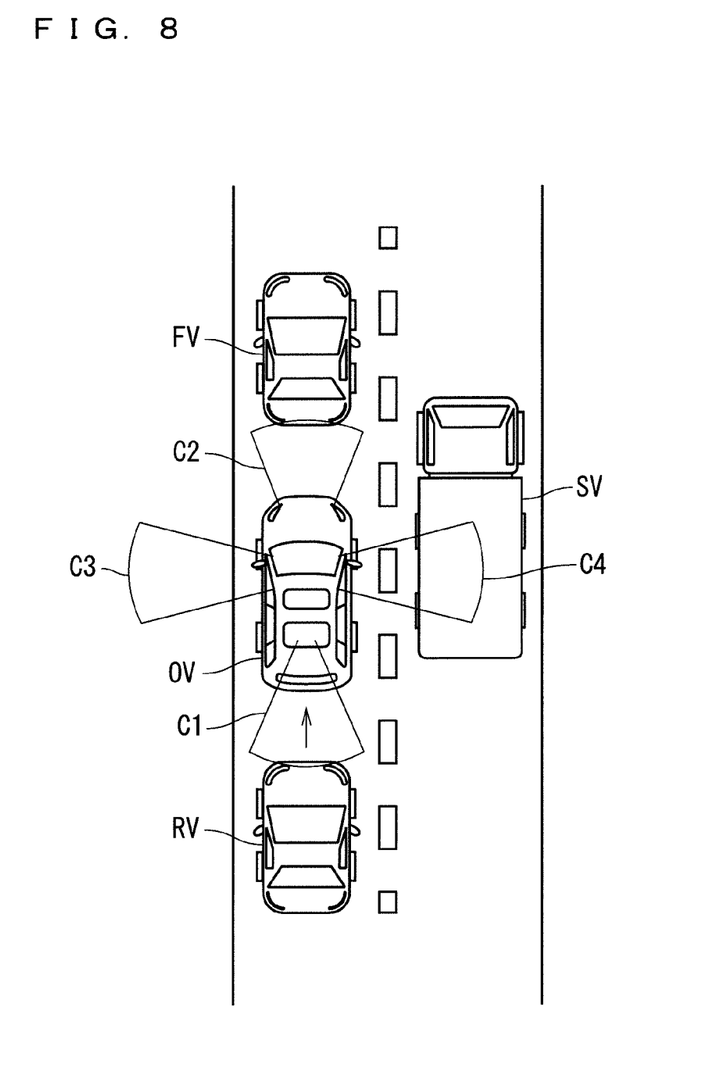
FIG. 8 is a diagram illustrating checking of empty spaces around the subject vehicle.
Figure 9:
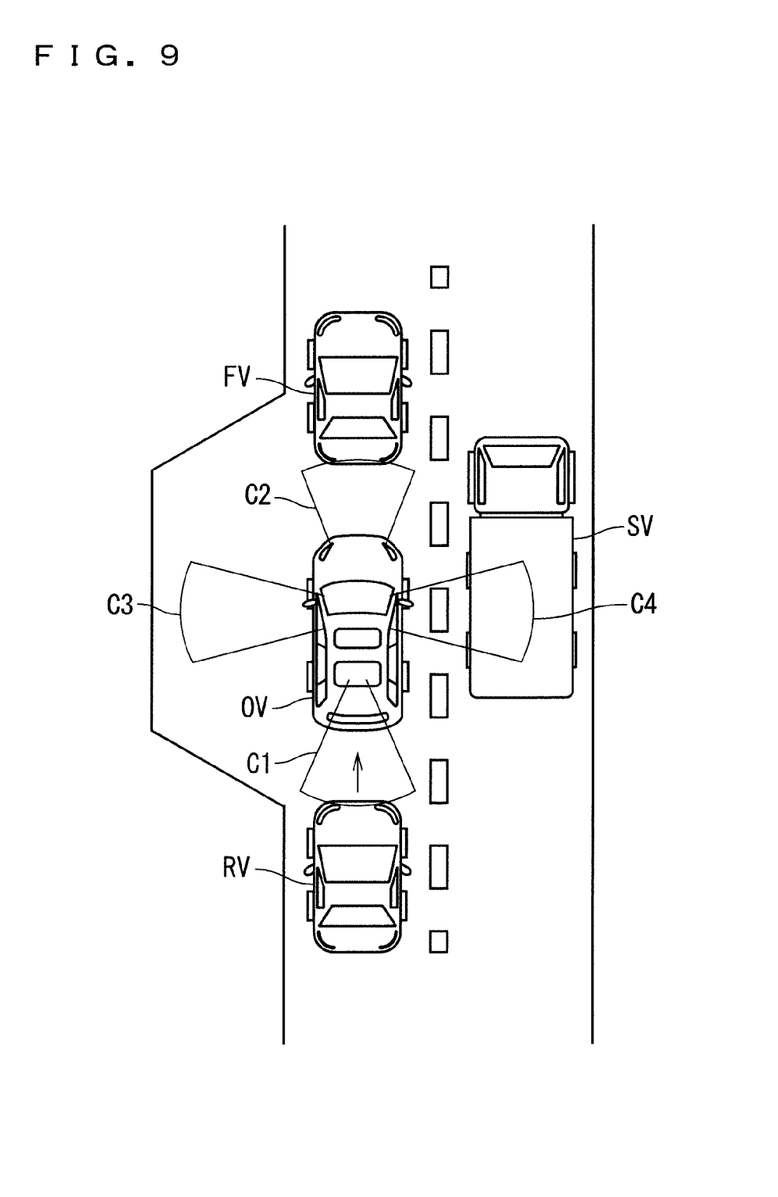
FIG. 9 is a diagram illustrating checking of empty spaces around the subject vehicle.

The following describes how to check for an empty space around the subject vehicle OV in detail with reference to FIGS. 8 and 9. FIG. 8 illustrates no empty space around the subject vehicle OV. FIG. 8 also illustrates that the front-image capturing camera C2 and the right-image capturing camera C4 are respectively capturing a preceding vehicle FV and a right vehicle SV, and that the following vehicle RV is approaching the subject vehicle OV. No vehicle is captured by the left-image capturing camera C3. This is because the left of the subject vehicle OV is the roadside; thus a guardrail and other things are captured. Accordingly, the peripheral-circumstance determining unit 3, through pattern matching, determines that there is a guardrail, and that no empty space is on the left.

FIG. 9 illustrates an escape space on the left of a road, and neither a vehicle nor a guardrail and other things is captured by the left-image capturing camera C3. Accordingly, the peripheral-circumstance determining unit 3 determines that there is an empty space on the left.

Based on the vehicle distance between the following vehicle RV and the subject vehicle OV, and the relative speed, which are determined in step S8, the posterior-driver state identifying unit 2 determines whether the subject vehicle OV might collide against the following vehicle RV (step S9). If the subject vehicle OV is determined to possibly collide against the following vehicle RV, the posterior-driver state identifying unit 2 warns the following vehicle RV of the possible collision via the communication unit 5, and also alerts the driver of the subject vehicle OV (step S10). The result of the determination is transmitted to the autonomous driving unit 4.

The determination on possible collision against the following vehicle RV is made by referring to a table that is prepared in advance, the table showing the possibility of collision with respect to the combination of the vehicle distance and the relative speed. The determination on possible collision based on the vehicle distance and the relative speed enables highly accurate determination.

It is noted that the posterior-driver state identifying unit 2 may determine possible collision against the following vehicle RV on the basis of only the vehicle distance between the following vehicle RV and the subject vehicle OV.

If the subject vehicle OV is determined to not possibly collide against the following vehicle RV in step S9, the procedures after step S2 are repeated. If the subject vehicle OV is determined to possibly collide against the following vehicle RV, the autonomous driving unit 4 determines whether the result of the checking in step S8 indicates that there is an empty space around the subject vehicle OV (step S11). If the result indicates that there is an empty space, the autonomous driving unit 4 controls the subject vehicle OV to move to the empty space (step S12), so that a collision against the following vehicle RV is avoided.

For instance, when there is an empty space in front of the subject vehicle OV, the autonomous driving unit 4 speeds up the subject vehicle OV to extend the vehicle distance between the subject vehicle OV and the following vehicle RV to an optimal distance (e.g., to a vehicle distance recommended depending on a vehicle speed), and controls the subject vehicle OV to autonomously drive so as to keep the optimal distance. Meanwhile, when there is an empty space on the left or right side of the subject vehicle OV (e.g., when the adjacent lane is available), the autonomous driving unit 4 controls the subject vehicle OV to move (escape) to the empty space on this side, so that a collision against the following vehicle RV is avoided. Such an operation enables the subject vehicle OV to avoid a collision under autonomous driving control with more certainty if a following vehicle in dangerous driving state is approaching.

Meanwhile, if the result of the checking in step S8 indicates that no empty space is around the subject vehicle OV in step S11, the posterior-driver state identifying unit 2 notifies the following vehicle RV of an emergency via the communication unit 5. In response to the emergency notification, an autonomous driving apparatus, when being on board the following vehicle RV, is forcedly actuated to control the following vehicle RV to automatically decelerate so that the vehicle distance between the subject vehicle OV and the following vehicle RV is kept or increased (step S13) for avoidance of a collision against the subject vehicle OV. Such an operation enables collision avoidance with certainty if no empty space is around the subject vehicle OV.

The aforementioned control system can be established between vehicles made by the same automobile manufacturer, or between vehicles having autonomous driving apparatuses that conform to a unified standard.

It is noted that when the following vehicle RV does not include an autonomous driving apparatus, the autonomous driving unit 4 of the subject vehicle OV may warn the driver of an emergency and then cancel autonomous driving, so that the driver can operate the subject vehicle OV to avoid a collision against the following vehicle RV.

It is also noted that when the following vehicle RV includes an autonomous driving apparatus, the autonomous driving apparatus may be forcedly actuated at the time of alerting the following vehicle RV in step S10 to control the following vehicle RV to automatically decelerate so that the vehicle distance between the subject vehicle OV and the following vehicle RV can be kept or increased.

Process for Identifying Driver of Following Vehicle

Figure 5:
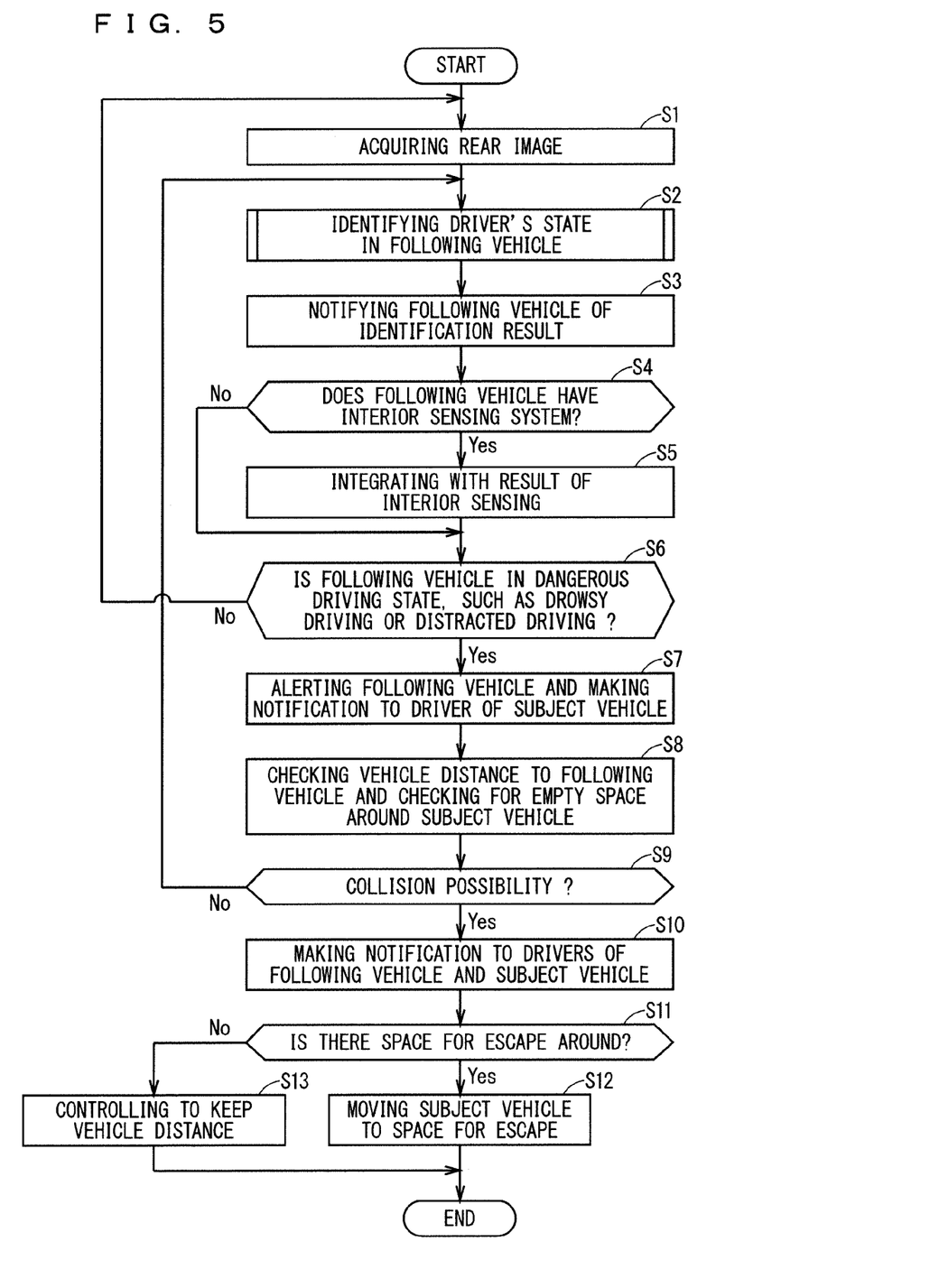
FIG. 5 is a flowchart showing a process in the driving assistance apparatus according to the embodiment of the present invention.
Figure 10:
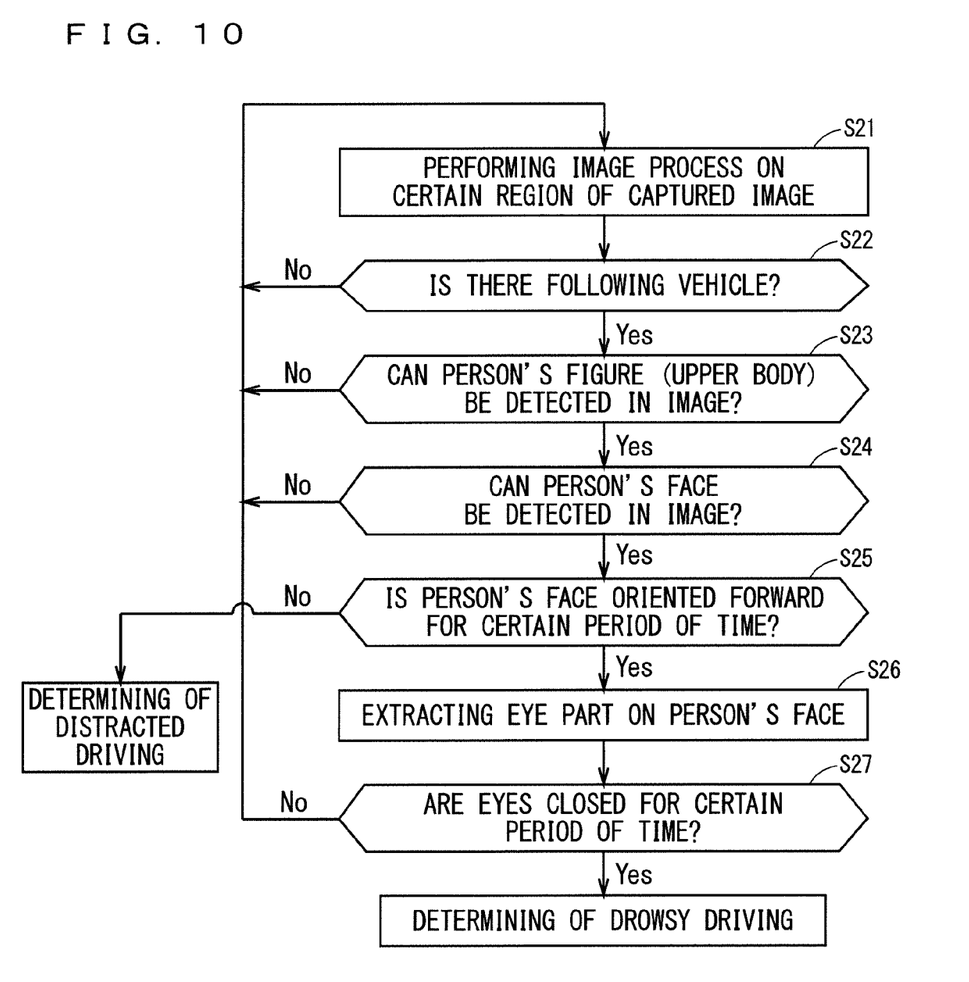
FIG. 10 is a flowchart showing a process for identifying the driver of the following vehicle.

Using the flowchart in FIG. 10, the following describes a process for identifying the driver of the following vehicle RV in step S2 in FIG. 5.

A certain region of the image at the back of the subject vehicle OV, which is captured by the rear-image capturing camera C1, undergoes predetermined image processing in the captured-image signal processor 1 (step S21). The certain region undergoes this processing in order to shorten the time necessary for image processing in the captured-image signal processor 1. The captured-image signal processor 1, when having sufficiently high processing speed, may process the entire region of the image at the back. An example of the certain region is the middle of the image at the back, in which the following vehicle RV is probably seen.

This image processing includes edge detection of the captured image and feature simplification of the captured image for extraction. The edge detection of the captured image is a conventional technique. An edge image can be obtained by, for instance, detecting an edge through first-order differential of an input image using a Sobel filter. Further, an example of identical edge detection through a first-order differential is edge detection using a Prewitt filter. Still further, an example of edge detection through a second-order differential is edge detection using a Laplacian filter. All of them are well-known techniques.

The data piece of the edge image is output to the posterior-driver state identifying unit 2 as a processed image data piece. Firstly, the posterior-driver state identifying unit 2 checks for a following vehicle RV through pattern matching using the edge image (step S22).

The edge image of the captured image created through the edge detection undergoes pattern matching with various pieces of vehicle feature information (e.g., the outline or shape of the front of the vehicle) held (stored) in advance in the driving assistance apparatus 100 or a predetermined storage (not shown) in the vehicle. If there is a vehicle having a piece of vehicle feature information whose pattern matches with the edge image, the posterior-driver state identifying unit 2 determines that there is a following vehicle RV. The process then proceeds to step S23. Meanwhile, if the edge image of the captured image fails to match with any of the vehicle feature information pieces, the posterior-driver state identifying unit 2 determines that there is no following vehicle RV; accordingly, the procedures after step S21 are repeated.

Figure 11:
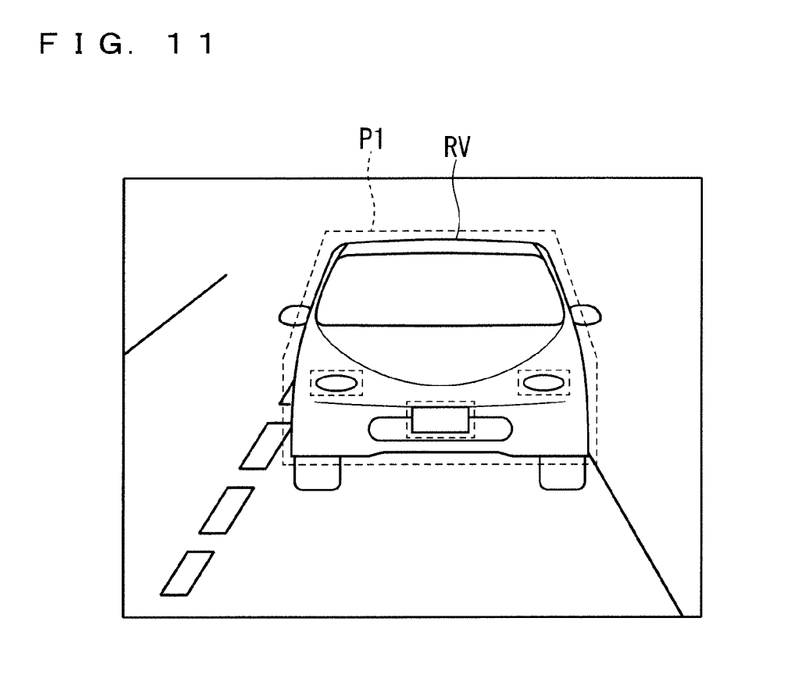
FIG. 11 is a diagram illustrating pattern matching for checking for a following vehicle.

FIG. 11 illustrates an edge image P1 of the following vehicle RV denoted by a dashed line. If there is a vehicle having a feature information piece whose pattern matches with the edge image P1, the posterior-driver state identifying unit 2 determines that there is a following vehicle RV.

After determining that there is a following vehicle RV in step S22, the next step is checking the figure of the person in the edge image of the captured image, such as the presence or absence of his/her upper body (step S23). Although pattern matching using the edge image is applied in this checking, template matching, which is a method of searching for a specific image called a template, enables efficient checking. That is, a person's upper body is represented in a simple form, such as the head and the chest; hence, preparing a template in advance is easy, and using a template facilitates identification. The various pieces of vehicle feature information can additionally include information about whether the driver's seat is on the right or left (i.e., whether the steering wheel is on the right or left). Accordingly, performing template matching mainly on the sides of the driver's seat enables more efficient checking of the edge image for the upper body.

Examples of how to calculate similarity in the template matching include sum of squared difference (SSD), which is a method of obtaining similarity from a sum of squares of the difference in pixel value between a target image and a template, normalized cross-correlation (NCC), which is a method of obtaining similarity by calculating the normalized cross-correlation of an image, and then, for a value closer to one, determining that the images are similar, and zero-mean normalized cross-correlation, which is a method of subtracting the respective average pixel values of a target image and a template from the target image and the template, followed by obtaining similarity by calculating the normalized cross-correlation of the target image. All of them are well-known techniques.

If the person's upper body has not been found in step S23, the procedures after step S21 are repeated. If the person's upper body has been found in step S23, the process proceeds to step S24.

Step S24 is checking the edge image of the person's upper body found in step S23 to see the presence or absence of the person's face. Herein, template matching enables efficient checking. That is, a person's face is represented by the outline or shape of the eyes, nose, and mouth, and the difference in approximate arrangement and approximate shape of these parts is small between individuals; hence, preparing a template in advance is easy, and using a template facilitates identification.

Figure 12:
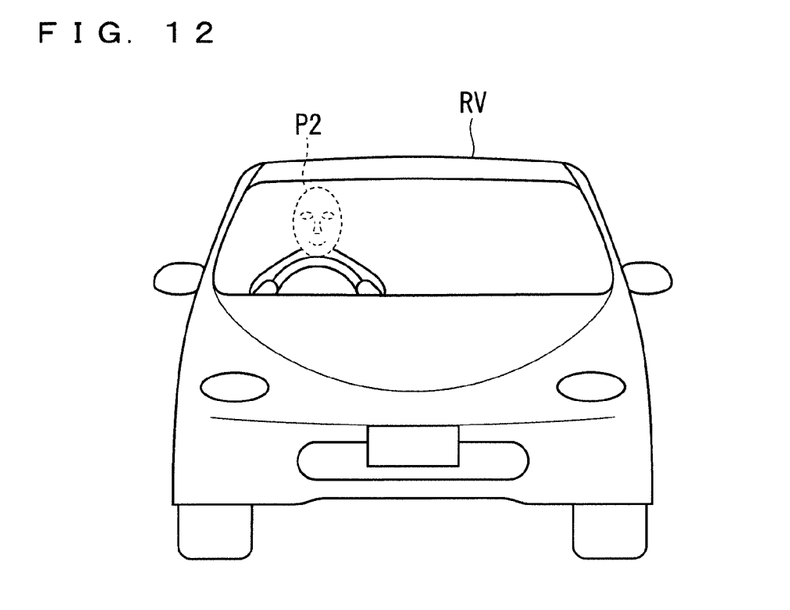
FIG. 12 is a diagram illustrating pattern matching for checking for a driver's face in the following vehicle.

FIG. 12 illustrates an edge image P2 of the face of the driver of the following vehicle RV denoted by a dashed line. Using a template whose pattern matches with the edge image P2 facilitates checking the presence or absence of the person's face.

If the person's face has not been found in step S24, the procedures after step S21 are repeated. If the person's face has been found in step S24, the process proceeds to step S25.

Step S25 is checking whether the person's face found in step S24 oriented forward for a certain period of time (e.g., for three seconds). Template matching is used in this checking. If a template (a template indicating the front side of the person's face) matches with the edge image, the person's face is determined to be oriented forward. If the template fails to match with the edge image, the person's face is determined to be not oriented forward. As such, if the template keeps matching with the edge image of the face for three or more seconds, the face is determined to be oriented forward for three seconds.

Figure 13:
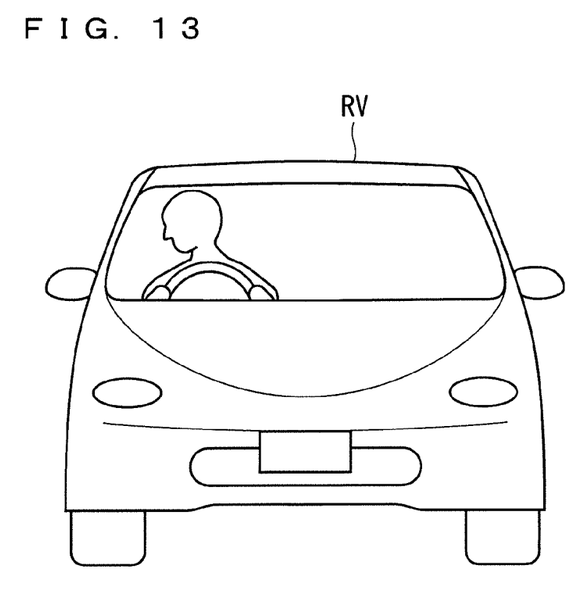
FIG. 13 is a diagram illustrating pattern matching for checking the orientation of the driver's face in the following vehicle.

If the person's face is determined to be not oriented forward for the certain period of time in step S25, the driver is determined to be distracted. FIG. 13 is a diagram showing one example where the person's face is not oriented forward for the certain period of time. In this situation, the driver can be distracted, or drowsy and nodding off. If the person's face is determined to be oriented forward for the certain period of time in step S25, the process proceeds to step S26.

Step S26 is extracting data of an eye part in the edge image of the person's face found in step S24. This data needs to be accurate enough to determine whether the eyes are closed or open. Then, step S27 is checking whether the eyes are closed for a certain period of time (e.g., for three seconds). Template matching is used in this checking. If a template (a template indicating closed eyes) matches with the edge image of the eye part extracted in step S26, the eyes are determined to be closed.

If the eyes are determined to be closed for the certain period of time in step S27, the driver is determined to be drowsy. Meanwhile, if the eyes are determined to be not closed for the certain period of time in step S27, the procedures after step S21 are repeated.

In the driving assistance apparatus 100 according to the embodiment, the image of the driver of the following vehicle RV is captured from the subject vehicle OV. Moreover, through identification of his/her driving state, whether the driver is in dangerous driving state is determined. Upon determining that the driver is in dangerous driving state, the driving assistance apparatus 100 operates to avoid a danger under autonomous driving control. Such a configuration secures the safety of the subject vehicle with certainty if the driver is dangerously driving the following vehicle RV.

While the invention has been shown and described in detail, the foregoing description is in all aspects illustrative and not restrictive. It is therefore understood that numerous modifications and variations can be devised without departing from the scope of the invention.

It is noted that in the present invention, the embodiment can be modified and omitted as appropriate within the scope of the invention.

The invention claimed is:

1. A driving assistance apparatus comprising:
processing circuitry; and
a communication device configured to communicate with an outside,
wherein the processing circuitry is configured to execute processes of,
identifying a driving state of a driver of a following vehicle on the basis of a rear image captured by a rear camera that is configured to capture a back of a subject vehicle,
determining circumstances around the subject vehicle on a basis of images around the subject vehicle including the rear image, and
controlling autonomous driving of the subject vehicle on the basis of the driving state, which is identified in the identifying process, and the circumstances, which are determined in the determining process,
wherein the identifying process comprises
recognizing the driving state by determining, through pattern matching, a face orientation of the driver of the following vehicle and whether eyes of the driver of the following vehicle are open or closed,
determining that the following vehicle is in a dangerous driving state when the eyes of the driver of the following vehicle are closed for a preset period of time, and
upon determining that the following vehicle is in the dangerous driving state, notifying the following vehicle of the dangerous driving state via the communication device, and
wherein the controlling process comprises
upon determination, in the identifying process, that the following vehicle is in the dangerous driving state, controlling the autonomous driving on the basis of the circumstances, which are determined in the determining process, so that a collision against the following vehicle is avoided,
wherein the identifying process comprises
acquiring a vehicle distance between the following vehicle and the subject vehicle on the basis of the rear image, and
determining a possibility of the collision against the following vehicle on the basis of the vehicle distance,
wherein the determining process comprises
determining circumstances of left and right sides of the subject vehicle on the basis of a left image and a right image taken by a left camera and a right camera, respectively,
wherein the controlling process comprises
controlling the autonomous driving to move the subject vehicle to a space, upon determination, in the identifying process, that the following vehicle is in the dangerous driving state and the subject vehicle possibly collides against the following vehicle, and upon determination, in the determining process, that the space for the subject vehicle to move is present on at least one of the left and right sides of the subject vehicle.

2. The driving assistance apparatus according to claim 1, wherein the identifying process further comprises
notifying the following vehicle of an emergency via the communication device, and causing an autonomous driving apparatus included in the following vehicle to decelerate the following vehicle, upon determination, in the identifying process, that the following vehicle is in the dangerous driving state and that the subject vehicle possibly collides against the following vehicle, and upon determination, in the determining process, that no space for the subject vehicle to move is around the subject vehicle including the left and right sides of the subject vehicle.

3. The driving assistance apparatus according to claim 2, wherein the identifying process comprises determining the possibility of the collision against the following vehicle on the basis of the vehicle distance, and a relative speed between the following vehicle and the subject vehicle.

4. The driving assistance apparatus according to claim 1, wherein the identifying process comprises determining the possibility of the collision against the following vehicle on the basis of the vehicle distance, and a relative speed between the following vehicle and the subject vehicle.

5. The driving assistance apparatus according to claim 1, wherein the identifying process comprises acquiring, via the communication device, a driving state of the driver of the following vehicle detected by an interior system that is included in the following vehicle, the interior system being configured to detect the driving state of the driver and alert the driver, and determining whether the following vehicle is in the dangerous driving state, on the basis of the driving state of the driver detected by the interior system and the driving state of the driver identified in the identifying process.

6. The driving assistance apparatus according to claim 1, wherein the identifying process comprises a process of, upon determining that the following vehicle is in the dangerous driving state, notifying the subject vehicle of the dangerous driving state.

7. The driving assistance apparatus according to claim 6, wherein the notifying process comprises displaying an alert on a superimposition display disposed in part of a windshield.

8. A driving assistance method comprising the steps of:
(a) identifying a driving state of a driver of a following vehicle on a basis of a rear image captured by a rear camera that is configured to capture a back of a subject vehicle;
(b) determining circumstances around the subject vehicle on the basis of images around the subject vehicle including the rear image; and
(c) controlling autonomous driving of the subject vehicle on the basis of the driving state, which is identified in step (a), and the circumstances, which are determined in step (b), wherein step (a) comprises
a step of recognizing the driving state by determining, through pattern matching, a face orientation of the driver of the following vehicle and whether eyes of the driver of the following vehicle are open or closed,
a step of determining that the following vehicle is in a dangerous driving state when the eyes of the driver of the following vehicle are closed for a preset period of time, and
a step of, upon determination that the following vehicle is in the dangerous driving state, notifying the following vehicle of the dangerous driving state, wherein step (c) comprises
a step of, upon determination in step (a) that the following vehicle is in the dangerous driving state, controlling the autonomous driving on the basis of the circumstances, which are determined in step (b), so that a collision against the following vehicle is avoided, wherein step (a) further comprises
step (a-1) of acquiring a vehicle distance between the following vehicle and the subject vehicle on the basis of the rear image, and determining a possibility of the collision against the following vehicle on the basis of the vehicle distance, wherein step (b) comprises
a step of determining circumstances of right and left sides of the subject vehicle on the basis of a left image and a right image taken by a left camera and a right camera, respectively, and wherein step (c) further comprises
a step of, upon determination in step (a) that the following vehicle is in the dangerous driving state and that the subject vehicle possibly collides against the following vehicle, and upon determination in step (b) that a space for the subject vehicle to move is present on at least one of the left and right sides of the subject vehicle, controlling the autonomous driving to move the subject vehicle to the space.

9. The driving assistance method according to claim 8, wherein
the driving assistance method comprises the step of
(d) upon determination in step (a) that the following vehicle is in the dangerous driving state and that the subject vehicle possibly collides against the following vehicle, and upon determination in step (b) that no space for the subject vehicle to move is around the subject vehicle including the left and right sides of the subject vehicle, notifying the following vehicle of an emergency and decelerating the following vehicle, the deceleration being performed by an autonomous driving apparatus included in the following vehicle.

10. The driving assistance method according to claim 9, wherein step (a-1) comprises determining the possibility of the collision against the following vehicle on the basis of the vehicle distance, and a relative speed between the following vehicle and the subject vehicle.

11. The driving assistance method according to claim 8, wherein step (a-1) comprises determining the possibility of the collision against the following vehicle on the basis of the vehicle distance, and a relative speed between the following vehicle and the subject vehicle.

12. The driving assistance method according to claim 8, comprising the steps of:
(e) before step (c), acquiring a driving state of the driver of the following vehicle detected by an interior system that is included in the following vehicle, the interior system being configured to detect the driving state of the driver and alert the driver; and
(f) making a final determination on whether the following vehicle is in the dangerous driving state, on the basis of the driving state of the driver detected by the interior system and the driving state of the driver identified in step (a).

13. The driving assistance method according to claim 8, wherein step (a) comprises a step of, upon determination that the following vehicle is in the dangerous driving state, notifying the subject vehicle of the dangerous driving state.

14. The driving assistance method according to claim 13, wherein the step of notifying the subject vehicle of the dangerous driving state comprises a step of displaying an alert on a superimposition display disposed in part of a windshield.

* * * * *